April 5, 1960 P. M. MINDER 2,931,950
PROTECTION FOR SHUNT CAPACITOR BANKS
Filed March 12, 1956
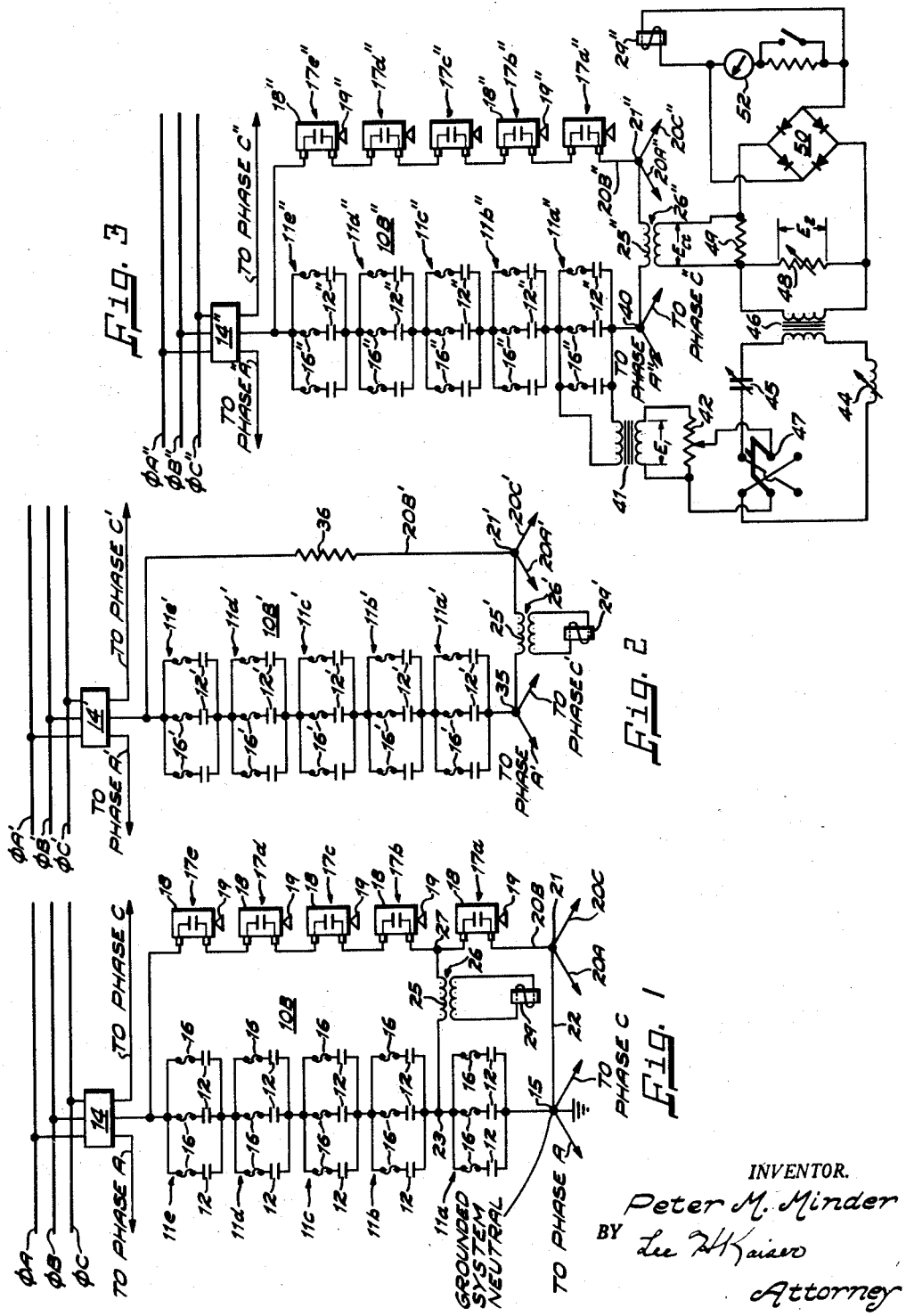
INVENTOR.
Peter M. Minder
BY Lee H. Kaiser
Attorney United States Patent Office 2,931,950
Patented Apr. 5, 1960

2,931,950

PROTECTION FOR SHUNT CAPACITOR BANKS

Peter M. Minder, Basel, Switzerland, assignor to McGraw-Edison Company, a corporation of Delaware Application March 12, 1956, Serial No. 570,980

9 Claims. (Cl. 317—12)

The present invention relates to shunt capacitor banks for alternating curent distribution and transmission lines and in particular to the protection of high voltage, shunt capacitor banks against damage resulting from failure of individual capacitors.

Power capacitors are frequently connected in shunt to alternating current distribution and transmission lines to improve the power factor and to relieve the system of the need of carrying at least part of the reactive requirements of the load, i.e., to relieve the line and source equipment of wattless current. When a relatively large amount of capacitive reactance is required in a high voltage system, the usual arrangement is to connect relatively small capacitors of standard kva. and voltage rating in groups each comprising a plurality of such capacitors in parallel and with a number of such groups in series from phase to phase, or from phase to neutral, of the distribution or transmission system. The phase to phase, or phase to neutral, voltage determines the number of series groups.

Conventionally the capacitors are individually fused, and if the fuse on one or more of the capacitors in a group of paralleled capacitors operates to remove a failed capacitor, the impedance of that group increases and consequently the voltage across the group rises. Inasmuch as standard capacitors are constructed to continuously withstand an overvoltage of only 110 percent of rated voltage without damage, it is necessary to provide means to protect the capacitors from overvoltages greater than 110 percent of rated voltage.

In one protective scheme a current sensitive relay is connected between the ungrounded neutrals of two equal star banks to detect unbalance between the neutrals. However, this scheme cannot be utilized in an installation which is not large enough to split into two equal star banks, and further is not applicable to grounded neutral star connected banks. In some installations grounding the neutral has distinct advantages, for example, it frequently permits using units having a lower insulation level than that corresponding to the circuit voltage, whereas when the neutral is floating the insulation level of the capacitor units should correspond to the circuit voltage.

In another protective scheme for a star bank, a potential or current transformer is connected between the neutral and ground. Failure of a capacitor unit causes bank unbalance and shifts the neutral. The resulting current flow to ground, or voltage between neutral and ground, operates a relay which in turn trips a circuit breaker to remove the capacitor bank from the line. One serious disadvantage of this means of protection is that unbalance voltages due to circuit conditions external to the capacitor bank also tend to shift the neutral and thus operate the protective equipment. In order to prevent the protective equipment from operating due to circuit disturbances external of the capacitor bank, the sensitivity of the protective device must be so low that the capacitors are inadequately protected against overvoltage. An additional defect of this scheme is that harmonics destroy the calibration of the unbalance detecting means.

It is an object of the invention to provide a shunt capacitor bank which is adequately protected against overvoltage resulting from failure of one or more of the capacitors.

It is a further object of the invention to provide means for protecting a high voltage shunt capacitor bank which cannot be physically divided into two equal halves, which means provides sensitivity substantially equal to that of the conventional scheme utilizing unbalance between neutrals of two equal banks.

Another object of the invention is to provide means for protecting a grounded neutral, star connected shunt capacitor bank which avoids the aforementioned disadvantages of schemes utilizing unbalance between neutral and ground and which provides greater sensitivity than prior art methods of protecting grounded neutral star banks.

These and other objects and advantages of the invention will be apparent from the following detailed description when taken in conjunction with the accompanying drawing wherein:

Fig. 1 is a circuit diagram of a high voltage, grounded neutral, star connected, shunt capacitor bank having protective means in accordance with one embodiment of the invention, only one phase of the bank being shown;

Fig. 2 is a circuit diagram of a high voltage, ungrounded neutral, star connected, shunt capacitor bank having protective means in accordance with an alternative embodiment of the invention, only one phase of the bank being shown; and Fig. 3 is a schematic circuit diagram of a high voltage, ungrounded neutral, star connected, shunt capacitor bank having protective means in accordance with still another embodiment of the invention and wherein the protective apparatus includes means for compensating for inherent differences in the impedances of the series-parallel groups of capacitors.

In accordance with the invention a capacitor bank having a plurality of serially arranged groups of paralleled capacitors connected in shunt to an alternating current system is protected by establishing a reference voltage point normally having a potential equal to the voltage of the junction between two of the serially arranged groups of paralleled capacitors and connecting current sensitive detecting means between said point and said junction to detect capacitor failure. When a capacitor fails, the impedance of the group including the faulted capacitor increases and causes the voltage of said junction to shift relative to the potential of the reference voltage point, thereby causing current to flow through the current sensitive detecting means. The reference voltage point is preferably established by connecting a plurality of serially arranged impedances, equal in number to the serially arranged groups, in shunt to the power system, whereby the voltage drop across each serially arranged group of paralleled capacitors is equal to the voltage drop across each impedance. In certain embodiments the reference voltage point is at the same potential as the neutral of a star bank protected in accordance with the invention.

The invention will be described with particular reference to a high voltage, shunt capacitor bank connected in star to a three phase alternating current electric system and comprising a plurality of phase groups 10, each of which includes the capacitors adapted to be connected to one of the phase conductors to supply reactive volt amperes to the three phase system. Only one phase group 10B is shown in Fig. 1, the other phase groups being identical thereto. Phase group 10B comprises a plurality of series groups 11a, 11b, 11c, 11d and 11e, each having a plurality of capacitor units 12 of standard kva. and voltage rating connected in parallel to provide the desired capacitive reactance and current capacity. The groups 11a, 11b, 11c, 11d and 11e are connected in series, and operation of circuit breaker 14 connects the serial arrangement of series group 11 of phase group 10B across the grounded neutral 15 and one phase conductor $\phi_B$ of a high voltage, polyphase, alternating current distribution of transmission system. It will be appreciated that a phase group (not shown) similar to phase group 10B and comprising a plurality of series groups of paralleled capacitor units is connected to each of the phase conductors $\phi_A$ and $\phi_C$. Use of capacitors of standard kva. rating in a suitable series-parallel arrangement is most economical in that it makes the most effective use of the dielectric material and permits the use of standard capacitors of relatively low cost. The voltage between phase conductor $\phi_B$ and grounded system neutral 15 determines the number of series groups 11, five such groups being shown in Fig. 1. An individual fuse 16 is connected in series with each capacitor unit 12 so that if a capacitor 12 fails, its fuse 16 will immediately operate and disconnect it from the bank. When one capacitor unit 12 of a series group 11 of paralleled capacitor units fails, the remaining units 12 of this group will be subjected to an overvoltage due to the change in circuit impedance. A sufficient number of units are operated in parallel in each series group 11 to limit this overvoltage upon failure of one unit to 110 percent of rated capacitor voltage until the unbalance is corrected. A continuous overvoltage of greater than 110 percent will endanger the unfaulted capacitors. Inasmuch as the overvoltage never exceeds 110 percent rated voltage, it is unnecessary to disconnect the bank each time a unit fails. In other words, the number of capacitor units is chosen so that two units must fail before the overvoltage on the unfaulted capacitors exceed 110 percent of rated voltage. Although only three capacitor units 12 are shown in each series group 11 in Fig. 1, it will be appreciated that the number of paralleled capacitors 12 in each series group 11 will be sufficient to prevent, in the event the fuse 16 in series with one of the capacitors 12 blows, an overvoltage on the remaining capacitor units exceeding 110 percent of normal voltage.

The number of capacitor units in parallel contribute to the fault current which will flow through a fuse in series with a shorted capacitor. Sufficient capacitors must be connected to provide a fault current which will clear the fuse before the casing of the shorted capacitor ruptures. This will usually require a fault current several times the current rating of the fuse, and the number of capacitor units in parallel in each series group must be increased when the number of series groups is increased. It will thus be seen that it is impossible in some installations to divide a capacitor bank into two equal halves, particularly when a large number of series groups must be utilized, to permit capacitor protection utilizing unbalance between neutrals of equal banks.

In the protective scheme of the invention means are provided to establish a reference voltage normally equal to the potential of a junction between two of the series groups 11, and current sensitive means are connected between this junction and the reference voltage point to detect the failure of any capacitor in the bank. The reference voltage is preferably established by connecting a plurality of equal impedances, 17a, 17b, 17c, 17d, and 17e equal in number to the series groups 11, in shunt to the alternating current system. It will be appreciated that the impedances 17 can be resistors or inductances, but inasmuch as capacitors will supply reactive volt amperes to the power system, it is preferable that the impedances 17 be capacitors. Preferably the capacitors 17 are of the two bushing type insulated for a higher voltage than the capacitor units 12 of the series groups 11, and it is schematically represented that the casings 18 of the capacitors 17 are mounted on insulators 19 which may be supported on the mounting frame (not shown) which supports the capacitors 12 of the corresponding phase group 11. In this arrangement the voltage drop across each capacitor 17 is normally equal to the voltage drop across each series group 11, and current sensitive means can be connected between the junctures of two of said impedances 17 (the reference voltage point) and an equipotential junction of two of said groups 11 to detect a change in voltage of either of said junctions due to failure of a capacitor 12 or a capacitor 17. It will be appreciated that this embodiment of the invention is applicable to both single phase and polyphase capacitor banks. In a polyphase system the groups of shunt connected capacitors are in star and define a neutral, and the reference voltage point may be at the potential of the neutral.

In the polyphase capacitor bank shown in Fig. 1 three branches 20A, 20B and 20C each comprising a plurality of serially arranged impedances 17 are joined at a common point 21 and connected in star to the power system. Only one branch 20B is shown, the other two being identical thereto. The common point 21 is connected to grounded neutral 15 of the power system by a conductor 22. Inasmuch as the number of impedances 17 in each branch 20 is equal to the number of series groups 11, the voltage drop across each capacitor 17 is equal to the voltage drop across each series group 11. The capacitors 17 are preferably unfused. Branch 20B is in parallel with the serial arrangement of groups 11 of phase group 10B, and the capacitors 17 of branch 20B are connected to phase conductor $\phi_B$ upon closure of circuit breaker 14. The branches 20A and 20C connected to phase conductors $\phi_A$ and $\phi_C$ upon closure of circuit breaker 14 are identical to branch 20B, and in order to facilitate the understanding of the invention they are omitted from the drawing.

In each phase group 10 current sensitive detecting means connect the junction of two of the groups 11 to an equipotential joint on the corresponding branch 20. Preferably the junction 23 of the first and second groups 11a and 11b away from the grounded system neutral 15 in phase group 10B are connected by the primary 25 of a current transformer 26 to the junction 27 of the first and second capacitors 17a and 17b away from the common point 21. Preferably the current transformer 26 is of the 8.7 or 15 kilovolt insulation class, and it will be apparent that a similar current transformer will be associated with each phase group 10 of the star capacitor bank.

Normally the voltage drop across series groups 11a is equal to that across capacitor 17a, no potential exists between points 23 and 27, and no current flows through the primary 25 of current transformer 26. If the fuse 16 in series with any capacitor 12 in phase group 10B opens to remove a failed capacitor, the impedance of the series group 11 containing the faulted capacitor increases, the voltage no longer divides equally among the series connected groups 11, but increases on the series group 11 containing the faulted capacitor, and a potential existing between points 23 and 27 causes a flow of current through the primary 25 of current transformer 26 which can be detected on the secondary side thereof. Preferably a relay is connected in series with the secondary of the current transformer associated with each phase group, e.g., relay 29 is connected in series with the secondary of current transformer 26. This arrangement indicates which phase group 10 the faulted capacitor 12 is in. In alternative embodiments the secondaries of the current transformers of all the phase groups 10 are connected in parallel and this paralleled arrangement is connected in series with a relay to provide an unbalance detecting circuit. In the event of failure of a capacitor unit 12 in phase group 10B, relay 29 may, if desired, complete a circuit to the trip coil (not shown) of circuit breaker 14 to disconnect the capacitor bank from the power system.

The capacitor bank illustrated in Fig. 2 is similar to that of Fig. 1 except that the neutral of the bank is floating, and parts in the embodiment of Fig. 2 similar to those of Fig. 1 are given the same reference numeral with the addition of the prime (') designation and their description will not be repeated. In this embodiment the reference voltage point is at the potential of the floating neutral 35 of the capacitor bank. Each of the three branches 20' connected at common point 21' includes an impedance 36 which is shown as a resistance, and the resistances 36 in all the branches 20A', 20B' and 20C' are equal. The branches 20' thus are in star and the common point 21' at which they are joined provides an auxiliary neutral normally equal in potential to the floating neutral 35 of the capacitor bank. It is apparent that each impedance 36 may comprise a plurality of resistances each having a lower insulation rating than the circuit voltage. The primary 25' of a current transformer 26' is connected between floating neutral 35 of the capacitor bank and auxiliary neutral 21', and the secondary of the current transformer 26' is connected in series with a relay 29' which may upon operation complete a circuit (not shown) to the trip coil of circuit breaker 14'. Operation of a fuse 16' in series with any capacitor 12' changes the impedance of the group 11' containing the faulted capacitor and causes a shift of the voltage of bank neutral 35 relative to the voltage of auxiliary neutral 21'. The resulting flow of current through primary 25' causes operation of relay 29' to give an indication of capacitor failure, and relay 29' may, if desired, complete a circuit to the trip coil (not shown) of circuit breaker 14'. Although the fact that the impedance of resistance 36 is much higher than that of a series group 11 limits the magnitude of the current flow through primary 25' upon failure of a single capacitor 12, its magnitude is sufficient to actuate means to trip the circuit breaker 14'. If desired a second current transformer (not shown) may be utilized to step up the magnitude of the unbalance current in order to operate a cut-off relay 29'.

The capacitor bank of Fig. 3 is similar to the embodiments shown in Figs. 1 and 2 and differs from the embodiment of Fig. 1 principally in that the neutral of the bank is floating and that means are provided in the detecting circuit to compensate for inherent differences in impedance of the series-parallel groups of capacitors. Many of the elements of the embodiment of Fig. 3 are similar to parts of Figs. 1 and 2 and are given the same reference numerals with the addition of the double prime designation ("). The neutral 40 of the bank is floating and the common point 21" of the branches 20" is normally at the same potential as neutral 40. Each branch 20 comprises a plurality of capacitive reactances 17" in series in a manner identical to that of Fig. 1. Differences in impedance of the phase groups 10", or differences in impedance of the branches 20", may cause unbalance current to circulate through the primary 25" of current transformer 26" connected between floating neutral 40 and common point 21".

The protective scheme of Fig. 3 includes means to compensate for these unbalance currents, and such means are disclosed in detail and claimed in my copending application Ser. No. 763,925 having the same assignee as the present invention. Means are provided to derive a voltage equal in magnitude and opposite in phase to the voltage generated in the current transformer secondary by circulating unbalance current, and thus buck, or cancel, any voltage in the detecting circuit due to such unbalance current. In the illustrated embodiment a potential transformer 41 derives a voltage $E_1$ which is related to the capacitor bank current, and as shown the primary of potential transformer 41 is connected across series group 11a" and the secondary voltage thereof impressed across a potentiometer 42. The voltage picked off potentiometer 42 is impressed across the series arrangement of a variable inductance 44, a variable capacitor 45, and the primary of coupling transformer 46. The secondary voltage $E_2$ of transformer 46 is impressed across variable resistance 48. The variable inductance 44, the variable capacitor 45, and a reversing switch 47 provide a phase shifting network which permit shifting of the derived voltage $E_2$ through 360 degrees relative to the voltage of the capacitor bank. The secondary voltage $E_{ct}$ of current transformer 26" is impressed across resistor 49, and the sum of the voltages $E_2$ and $E_{ct}$ is rectified in a full wave rectifier 50 and the output of rectifier 50 is impressed across a sensitive relay 29". A voltmeter 52 connected across the output of rectifier 50 may be used to indicate when the derived voltage $E_2$ is equal in magnitude and opposite in phase to $E_{ct}$, and the variable inductance 44, the variable capacitor 45, the reversing switch 47, and the variable resistances 42 and 48 permit adjustment of the magnitude and phase of the derived voltage $E_2$ through a wide range. When the phase shifting circuit is manually adjusted to give a zero reading on voltmeter 52, circulating unbalance currents due to inherent differences in impedance of the series-parallel capacitor have been compensated for in the detecting means and operation of relay 29" does not occur until a capacitor 12", or a capacitor 17" fails and causes relative shift of the voltages of neutral 40 and common point 21" to thereby increase $E_{ct}$ sufficiently to operate relay 29". Operation of relay 29" may be utilized to complete a circuit (not shown) to the trip coil of circuit breaker 14".

It will be appreciated that in all of the disclosed embodiments, circuit disturbances external of the capacitor bank cause a shift of the reference voltage point in the same direction and to the same extent as the shift of the junction point to which the current transformer is connected, and consequently circuit disturbances external of the capacitor bank have no effect on the calibration or sensitivity of the protective means.

Although the embodiment of Fig. 1 has been described as having the number of impedance elements 17 in each branch equal to the number of series groups 11 connected to the same phase conductor, the invention is not so limited. The illustrated arrangement was adopted merely for the purpose of providing the same voltage drop across each impedance element 17 as the potential across the corresponding series group 11. This embodiment of the invention is effective to protect a high voltage capacitor bank regardless of whether the number of impedance elements in each branch is smaller, equal to, or larger than the number of series groups of the capacitor bank connected to the same phase conductor and regardless of whether all of said elements are equal in impedance. The only condition that must be met to provide satisfactory protection is that the voltage drop between the juncture of two of the series groups to which the current sensitive means is connected and the grounded neutral is equal to the potential drop between the grounded neutral and the junction of the two impedance elements to which the current sensitive means is connected.

Although only a few polyphase embodiments of the invention have been shown and described, it will be appreciated that the invention is also applicable to single phase installations and that many other variations and modifications thereof will be apparent to those skilled in the art, and consequently it is intended to cover in the appended claims all such variations and modifications as fall within the true spirit and scope of the invention.

What I claim as new and desire to secure by Letters Patent of the United States is:

1. In a polyphase alternating current electric system having a grounded neutral, a bank of capacitors connected in star to said system with the neutral of said bank connected to said system neutral, said bank having a plurality of serially arranged groups connected between each phase conductor of said system and said grounded neutral, each group comprising a plurality of paralleled capacitor units, an individual fuse in series with each said capacitor unit, the number of capacitor units in each group being sufficient to prevent, upon operation of the fuse of one of the capacitors of said group, an overvoltage on the remaining capacitors of said group which if continuously applied would damage said remaining capacitors, a plurality of branches joined at a common point and connected in star to said system with said common point connected to said grounded neutral, each said branch comprising the serial arrangement of a plurality of capacitor units, the number of capacitor units in each said branch being equal to the number of groups connected between each phase conductor and the neutral of said bank, whereby the voltage drop across each capacitor unit in said branches is equal to the voltage drop across each group, and means for detecting failure of any capacitor unit, said detecting means including a plurality of current transformers equal in number to said phases, one current transformer being connected to each branch at the junction of the first and second capacitor units thereof removed from said common point and the opposite side of said current transformer being connected to the serially arranged groups associated with the same phase conductor as said branch at the junction of the first and second groups removed from the neutral.

2. In an alternating current electric system, a plurality of serially arranged groups of paralleled capacitors connected in shunt to said system, an individual fuse in series with each of said capacitors, the number of capacitors in each group being sufficient to prevent, upon operation of the fuse of one of the capacitors of said group, an overvoltage on the remaining capacitors of said group which is continuously applied would damage said remaining capacitors, a plurality of serially arranged capacitor units solidly connected together and in shunt to said system, the electrical impedance of each of said units being many times greater than that of one of said groups, and current responsive means connected between one of the juncture points of said groups and an equipotential juncture point of said capacitor units for detecting failure of any capacitor in said groups.

3. In an electric system in accordance with claim 2 wherein said plurality of serially arranged groups are in star and define a neutral and said one of said juncture points of said groups is said neutral.

4. In a polyphase electric system, a bank of capacitors connected in star to said system and having a plurality of serially arranged groups connected between each phase conductor of said system and the neutral of said bank, each group comprising a plurality of capacitors connected in parallel, an individual fuse in series with each of said capacitors, means for establishing a reference voltage normally equal to the potential of the neutral of said bank, said means comprising a plurality of branches of equal impedance joined at a common point and connected in star to said polyphase system, each branch including a plurality of serially arranged capacitor units connected between the neutral of said bank and each phase conductor, the electrical impedance of each of said units being considerably greater than that of one of said groups, and means including a current transformer connected between said common point and the neutral of said bank for detecting failure of any capacitor in said groups, said detecting means including means to compensate for any current flow through said current transformer due to inherent difference in the impedance of the serially arranged groups connected between said phase conductors and the neutral of said bank.

5. In a polyphase alternating current electric system having a grounded neutral, a bank of capacitors connected in star to said system and having the neutral connected to said system neutral, said bank having a plurality of serially arranged groups connected between each phase conductor of said system and the neutral, each group comprising a plurality of paralleled capacitors, an individual fuse in series with each of said capacitors, a plurality of branches of equal impedance joined at a common point and connected in star to said polyphase system with said common point connected to said grounded system neutral, each said branch comprising the serial arrangement of a plurality of capacitor units solidly connected together, the electrical impedance of each of said units being many times greater than that of one of said groups and each said unit normally carrying an electrical current the magnitude of which is only a minor fraction of the total current through one of said groups, and current sensitive means connected between one of said juncture points of said units of said branch and an equipotential juncture point of said serially arranged groups for detecting failure of any capacitor of said serially arranged groups.

6. In a polyphase alternating current electric system having a grounded neutral, a bank of capacitors connected in start to said system with the neutral connected to said grounded system neutral and having a plurality of serially arranged groups connected between each phase conductor of said system and the neutral of said bank, each group comprising a plurality of paralleled capacitors sufficient in number to prevent, upon operation of the fuse of one of the capacitors of said group, an overvoltage on the remaining capacitors of said group exceeding 110 percent of normal voltage, a plurality of branches of equal impedance joined at a common point and connected in star to said polyphase system with said common point connected to said grounded system neutral, each branch comprising the serial arrangement of a plurality of impedance elements, the electrical impedance of each of said elements being considerably greater than that of one of said groups, and current sensitive means including at least one current transformer connected between the juncture of two of said elements and an equipotential juncture of two of said groups for detecting failure of capacitors in said bank.

7. In an alternating current electric system, a plurality of serially arranged groups of paralleled capacitors connected in shunt to said system, an individual fuse in series with each of said capacitors, a plurality of serially arranged unitary impedance elements connected in shunt to said system, each said element having an electrical impedance many times greater than that of one of said groups and normally carrying an electrical current the magnitude of which is only a minor fraction of the current through one of said groups, and means connected between the juncture of two of said groups and an equipotential juncture of two of said elements for detecting failure of capacitors in said groups.

8. In an alternating current electric system, a plurality of serially arranged groups of paralleled capacitors connected in shunt to said system, an individual fuse in series with each of said capacitors, the number of capacitors in each group being sufficient to prevent, upon operation of the fuse of one of the capacitors of said group, an overvoltage on the remaining capacitors of said group which if continuously applied would damage said remaining capacitors, means for establishing a reference voltage point having a potential equal to that of a juncture between two of said serially arranged groups of parallel capacitors, said means including the serial arrangement of a plurality of impedance units connected in shunt to said serial arrangement of groups, the electrical impedance of each of said units being many times greater than that of one of said groups, and current responsive means connected between said reference voltage point and said juncture for detecting failure of capacitors in said groups.

9. In a polyphase alternating current electric system, a bank of capacitors connected in star to said system and having at least one group of paralleled capacitors connected between each phase conductor of said system and the neutral of said bank, an individual fuse in series with each of said capacitors, the number of capacitors in each group being sufficient to prevent, upon operation of the fuse of one of the capacitors of said group, an overvoltage on the remaining capacitors of said group exceeding 110 percent of normal voltage, a plurality of impedance branches joined at a common point and connected in star to said polyphase system, each of said branches including at least one element having an electrical impedance considerably greater than that of one of said groups and normally carrying an electrical current the magnitude of which is only a minor fraction of the total current through one of said groups, said elements in any two of said branches joined at said common point constituting a serial arrangement of such elements between two of said phase conductors, and means for detecting capacitor failure in said bank including at least one current transformer connected at one end to the junction of two of said groups and at the opposite end to an equipotential juncture of two of said impedance elements.

References Cited in the file of this patent

UNITED STATES PATENTS

| | | |
|---|---|---|
| 1,483,552 | Pickard | Feb. 12, 1924 |
| 2,376,201 | Starr | May 15, 1945 |
| 2,447,658 | Marbury | Aug. 24, 1948 |
| 2,550,119 | Marbury | Apr. 24, 1951 |

FOREIGN PATENTS

| | | |
|---|---|---|
| 718,972 | Great Britain | Nov. 24, 1954 |